N. TREADWELL.

Gas Regulator.

No. 2,593. Reissued May 7, 1867.

Witnesses
M. Blanchard
Wm. Dawn

Inventor
N. Treadwell
Fr. Wm. Cunnoff
Attorney

N. PETERS, Photo-Lithographer, Washington, D. C.

United States Patent Office.

N. TREADWELL, OF NEW YORK, N. Y.

*Letters Patent No.* 58,321, *dated September* 25, 1866; *reissue No.* 2,593, *dated May* 7, 1867.

IMPROVED APPARATUS FOR SUPPLYING GAS ON STEAMBOATS AND OTHER VESSELS.

The Schedule referred to in these Letters Patent and making part of the same.

TO ALL WHOM IT MAY CONCERN:

Be it known that I, N. TREADWELL, of the city, county, and State of New York, have invented a certain new and improved Apparatus for Supplying Gas on Steamboats and other Vessels; and I do hereby declare that the following is a full, clear, and exact description thereof, which will enable others skilled in the art to make and use the same, reference being had to the accompanying drawing, forming part of this specification, in which—

Similar letters of reference indicate like parts.

Figure 1:
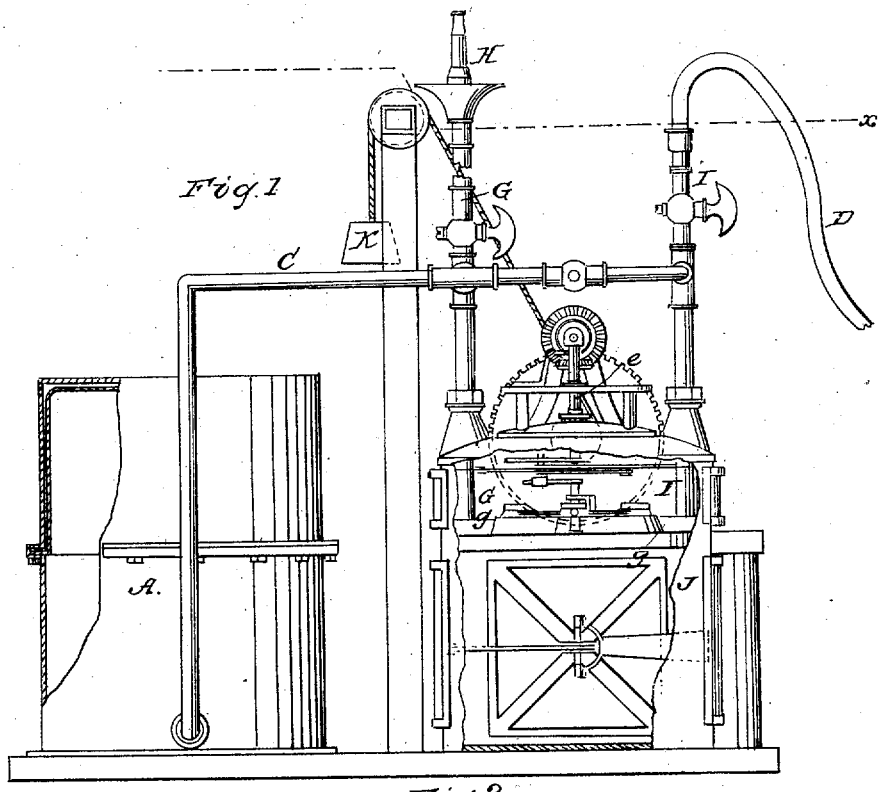
Figure 1 represents a side elevation of the mechanism employed by me.
Figure 2:
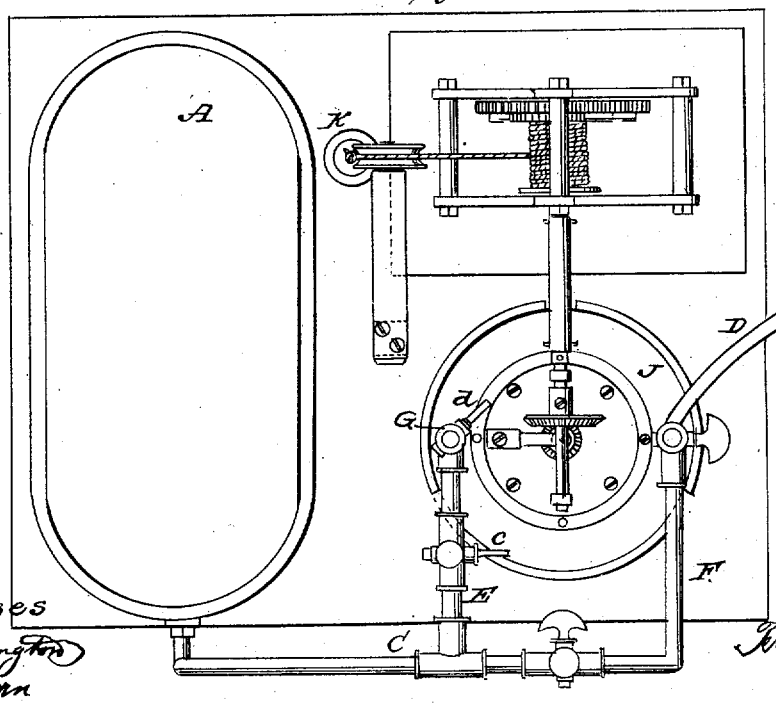
Figure 2 is a plan of the same at the line *x x*, fig. 1.

Heretofore gas-holders have been made for vessels in which a diaphragm has been used to separate the gas from atmosphere pumped into a space on the opposite side of the diaphragm to the gas, so as to give pressure to such gas, but the lights are affected by the vibration of the diaphragm, under the motion or jar often given to the vessel. The nature of my said invention consists in a pumping apparatus, actuated by mechanism, and placed between the gas-holder and the burners, so as to draw or receive the gas from the holder and pass it on in a regular and steady supply to the burners. By this means the supply of gas to the burners is not affected by the motion of the boat or the movement of the diaphragm in the gas-holder, and the supply of gas to the burners is entirely uniform and under control.

A represents a gas-holder, constructed of a large bag of India-rubber cloth or other suitable flexible material, and enclosed in a case of sheet metal or any other rigid material of sufficient strength to protect the gas-holder from injury. Said gas-holder is intended to hold a sufficient supply of gas to light the burners on a steamboat or vessel, and it is put in any convenient place on said boat, and supplied with gas through a pipe, C, which can be connected with a flexible pipe, D, leading to the street mains, or to a suitable gas-holder on shore, when the boat is at the wharf. From the pipe C extend two branch pipes, E F, one of which connects with the pipe G, leading to the burner or burners H, while the other connects with the pipe I, to which the flexible pipe D is attached. The pipes I and G connect with the circular gas-channel *g* of the pump J, which is composed of three (more or less) compartments, which alternately receive a supply of gas through the pipe I and discharge it through the pipe G, said compartments being provided with flexible diaphragms to which a reciprocating motion is imparted by the action of a weight, K. The construction of the pump, however, is well known, and requires no further explanation here. Neither does my invention relate to the pump itself, and I reserve the right to use, in place of the pump herein shown, any pump which will produce the desired effect. The connection between the pipes C D E F G and I and the burners H is regulated by stop-cocks *a b c d*. In charging the holder A with gas, the cocks *b* and *c* may be opened and the cocks *a* and *d* closed. The gas passing through the pump J alternately fills the several compartments of the same, the diaphragm of said pump being set in motion by the weight K, so that by their action the flow of gas to the holder is facilitated, and in doing so a revolving motion is imparted to the central shaft *e*, and through it to the registering wheels, and the quantity of gas passing into the holder A is indicated. When the holder is full the cocks *b* and *c* are closed, and the cocks *a* and *d* are opened. The diaphragms of the pump J are now set in motion by the action of the weight K, and the gas is drawn in through the pipes C and F, and discharged through the pipe A to the burners.

What I claim, and desire to secure by Letters Patent, is—

A pumping mechanism applied between the gas-holder and the burners on a boat or vessel, for taking the gas from the holder and supplying the same to the burners, substantially as set forth.

In witness whereof I have hereunto set my signature this fifth day of April, A. D. 1867.

N. TREADWELL.

Witnesses:

GEO. D. WALKER,

CHAS. H. SMITH.